United States Patent
Schucker

Patent Number: 5,510,149
Date of Patent: *Apr. 23, 1996

[54] METHOD AND DEVICE FOR APPLYING A PASTE

[75] Inventor: Josef Schucker, Pforzheim, Germany

[73] Assignee: SCA Schucker GmbH, Koenigsbach-Stein, Germany

[*] Notice: The term of this patent shall not extend beyond the expiration date of Pat. No. 5,419,930.

[21] Appl. No.: 395,761

[22] Filed: Feb. 28, 1995

Related U.S. Application Data

[63] Continuation of Ser. No. 119,207, filed as PCT/EP92/00613, May 19, 1992, Pat. No. 5,419,930.

[30] Foreign Application Priority Data

Mar. 27, 1991 [EP] European Pat. Off. .............. 91810228

[51] Int. Cl.$^6$ ........................................ B05D 7/00
[52] U.S. Cl. .............. 427/421; 427/8; 427/724; 427/426; 118/679; 118/680; 118/683; 118/666; 118/684; 118/688; 118/692
[58] Field of Search ..................... 427/421, 424, 427/426, 8; 118/679, 680, 683, 666, 684, 688, 692

[56] References Cited

U.S. PATENT DOCUMENTS

| | | | |
|---|---|---|---|
| 4,709,858 | 12/1987 | Stern et al. ............... | 239/296 |
| 4,987,854 | 1/1991 | Hall .......................... | 118/679 |
| 5,419,930 | 5/1995 | Schucker .................. | 427/421 |

FOREIGN PATENT DOCUMENTS

| | | |
|---|---|---|
| 0259689 | 3/1988 | European Pat. Off. . |
| 0367985 | 5/1990 | European Pat. Off. . |
| 0373341 | 6/1990 | European Pat. Off. . |
| 3423094 | 1/1986 | Germany . |
| 3540619 | 5/1987 | Germany . |
| 3728054 | 3/1989 | Germany . |
| 3838360 | 5/1989 | Germany . |
| 3822835 | 3/1990 | Germany . |
| 4012879 | 3/1991 | Germany . |
| WO88/03059 | 5/1988 | WIPO . |

*Primary Examiner*—Shrive Beck
*Assistant Examiner*—David M. Maiorana
*Attorney, Agent, or Firm*—Flynn, Thiel, Boutell & Tanis

[57] ABSTRACT

In the method described, a compound substantially in the form of a paste is fed by means of a pump from a storage container (1) to a metering device (3) which determines the amount of paste to be applied to a workpiece (B). From the metering device, the paste is fed to a spray head (S) where it is mixed with compressed air from a cylinder (4) or other suitable supply and sprayed on to the workpiece (B). The amount of compressed air supplied to the paste for spraying purposes is controlled by means of a control unit (6) in such a way that a strip of substantially constant width is applied to the workpiece (B).

19 Claims, 1 Drawing Sheet

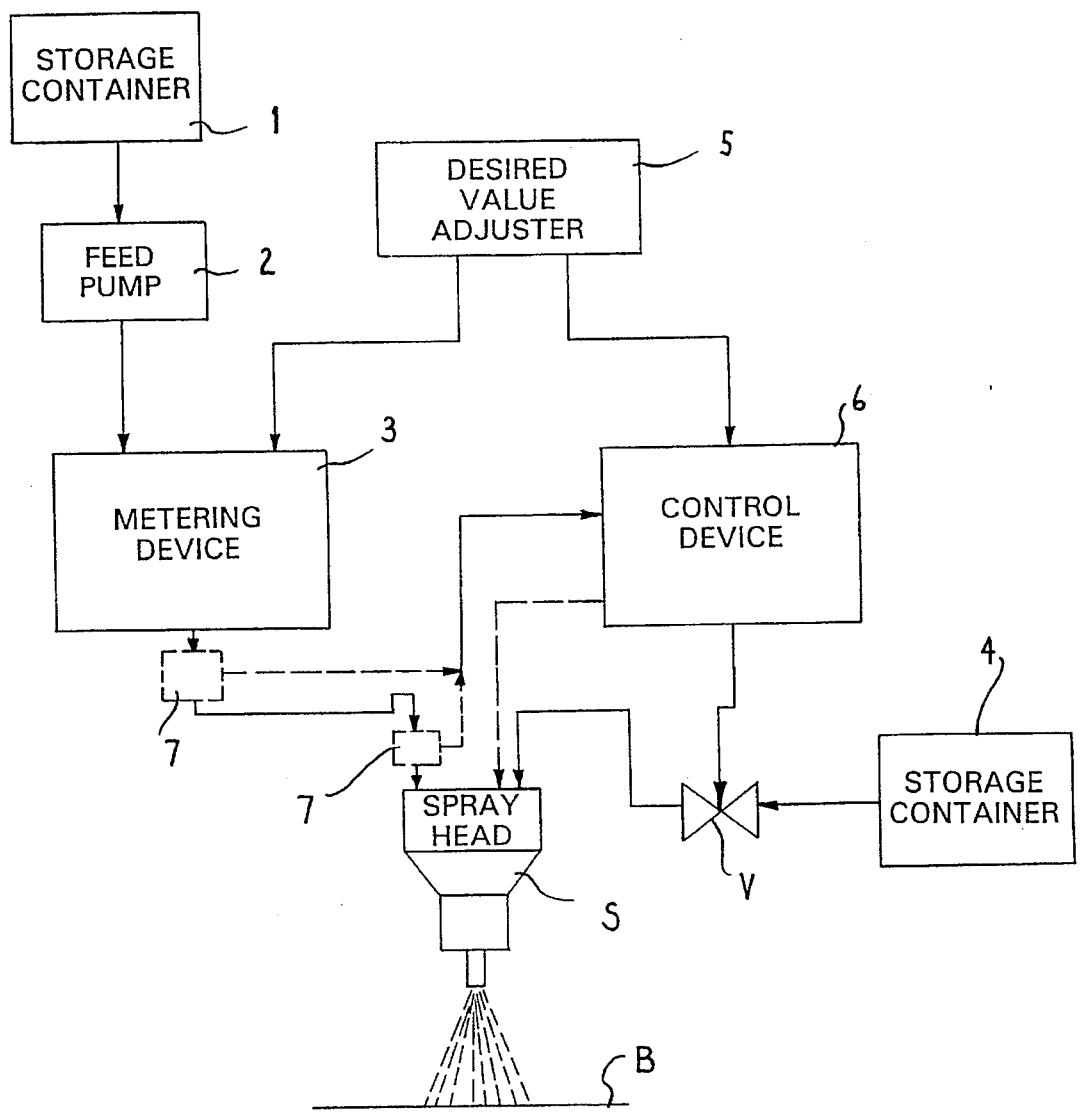

METHOD AND DEVICE FOR APPLYING A PASTE

This is a continuation of Ser. No. 08/119 207, filed Sep. 22, 1993, (which filing represents the nationalizing of PCT Ser. No. PCT/EP92/00613 filed Mar. 19, 1992) now U.S. Pat. No. 5,419,930.

FIELD OF THE INVENTION

The invention relates to a method and a device for applying a paste or paste-like mass, in particular a hardenable glue or sealer, onto a workpiece, in which the paste is fed by feed pressure to a spray device, in particular to the application nozzle of a spray head, is separated or mixed by, the action of a compressed gas preferably consisting of compressed air or inert gas and is sprayed onto the workpiece, with the workpiece and the spray device being moved relative to one another.

BACKGROUND OF THE INVENTION

In a known method of this type, which is utilized in the industrial processing of car-body parts, namely during the gluing of car-body sheet metal panels, a hardenable glue is sprayed with the help of a spray head onto the edge of the inner surface of an outer car-body sheet metal panel, which is supposed to be glued to an inner sheet metal panel. This is done by the glue being mixed with compressed air in the spray head and being then sprayed onto the edge of the car-body outer sheet metal panel. The width of the sprayed-on strip of glue depends decisively on the relationship between the amount of glue and the amount of compressed air. The inner sheet metal panel is subsequently placed onto the car-body outer sheet metal panel and the edge of the outer sheet metal panel, which edge is sprayed with the glue, is folded around the inner sheet metal panel. The hardening process can then be activated, for example, by heating this arrangement.

By spraying on the glue no undesired air pockets occur in the fold during the hardening operation, which air pockets would bring about a danger of corrosion. However, variations in the consistency of the strand of glue exiting from the spray head, or in the amount conveyed can occur during the spray application, which can result in changes in the width of the strip of glue sprayed onto the workpiece even with a constant compressed-gas supply. These variations can, for example, be due to a change in the viscosity of the glue, which in turn can be due to variations in the temperature or changes in the composition of the glue. This can result either in an incomplete filling of the areas to be glued or in protruding glue. Both cases have disadvantages. When the strip of glue is too narrow, the gluing of outer sheet metal panel to the inner sheet metal panel is insufficient, whereas when the strip of glue is too wide glue can protrude over the edge of the fold, which can lead to difficulties during the hardening operation and during the later cleaning operation.

Starting out from this, an object of the invention is to develop a method and a device of the above-mentioned type, with which an even application of glue onto the workpiece surface is guaranteed.

To attain this purpose the invention suggests that the amount of compressed gas supplied per unit of time and/or its flow speed is controlled in such a manner that a strip of paste of an essentially constant width is sprayed on along the workpiece.

In order to achieve this, it is possible according to an advantageous development of the invention to measure the feed pressure of the paste prior to its entry into the spray device and to control the amount of compressed gas supplied per unit of time in functional dependency of the measured feed pressure.

A further advantageous or alternative development of this method is to measure the temperature of the paste prior to its entry into the spray device and to control the amount of compressed air or inert gas in functional dependency of the measured temperature.

A further advantageous development of the invention provides that the volume or mass stream of the paste is adjusted to a desired value by varying the feed pressure at a constant flow cross section of the spray device. This is done, for example, in such a way that the feed or mass stream is adjusted to a predetermined value by varying the driving pressure or the electrical driving performance of a preferably electrically driven metering device. The compressed gas supplied per unit of time can in this case be controlled in functional dependency of the driving pressure or rather the driving performance or the driving voltage level derived therefrom. The stream volume can thereby be measured directly by means of a flow meter or indirectly through the piston speed of a metering cylinder forming the metering device. The functional dependency between the compressed-gas supply and the measuring parameter determining the compressed-gas supply can be provided, for example, in the form of a stored digital or analog, empirically determined calibration curve.

At varying mass flow through the spray device it is basically also possible to control the relative speed between spray device and workpiece in such a manner that the same amount of paste per unit area is sprayed onto the workpiece.

According to the device the object of the invention can be attained by providing a device for controlling the compressed-gas supply to the spray head, through which the compressed-gas supply is controlled in accordance with a desired width of the strip of glue applied along the workpiece.

The device of the invention includes a storage container for the paste, a feed pump for feeding the paste to a metering device, a further storage container or a supply connection for the compressed gas and a valve for controlling the compressed-gas supply to a spray head, with the spray head mixing the paste coming from the metering device with compressed gas and spraying it onto the workpiece, while the workpiece and the spray head are being moved relative to one another. A valve for the compressed-gas supply is in this case controlled through the control device in such a manner that the spray head sprays a strip of paste of an essentially constant width on along the workpiece.

An advantageous development of the invention provides a pressure sensor for measuring the feed pressure, which pressure sensor is arranged in front of the spray head, or a temperature sensor for measuring the temperature of the paste and a device for controlling the compressed-gas supply to the spray head, which device reacts to the measured feed pressure or the measured mass temperature.

A regulator is advantageously arranged in front of the spray head, through which regulator the volume or mass stream of the paste can be adjusted to a predetermined desired value by varying the feed pressure at a constant flow cross section in the spray head. In addition a preferably electrically driven metering pump for the paste, which metering pump can be controlled through the regulator, and a device for controlling the compressed-gas supply to the spray head, which device reacts to the driving pressure or rather the driving performance or voltage level of the metering pump, are provided. The volume or mass stream can be measured with the help of a flow meter arranged in front of the spray head in the feed pipe or with the help of a device for measuring the piston speed of a metering cylinder forming the metering pump, while the device for controlling the compressed-gas supply contains advantageously an analog or digital calibration-curve generator.

The measures of the invention give consideration to the knowledge that depending on the viscosity or stiffness of the glue a more or less viscous strand of glue exits from the application nozzle of the spray head. On the other hand, depending on the viscosity of this strand a more or less large amount of air or air speed is needed in order to selectively guide the strand in order to thus arrive at a specific strip width. The functional interrelations in this regard are given consideration according to the invention with the help of the empirically determined and electronically stored calibration curve.

The paste can be supplied through a metering cylinder to the application nozzle in the spray head. The piston speed is measured in this case as an indication of the volume of the amount of glue applied per unit of time. The driving pressure acting onto the piston is available as a further measurement. The pressure is higher at a pregiven metered amount when the viscosity of the paste is high. This pressure is thus an indirect measurement for the viscosity of the paste, which in turn depends on the temperature and on the composition of the paste. The driving pressure is usually produced through a feed system acting onto the piston, which feed system is, for example, electrically driven. The electrical voltage, which is applied to the feed system and which is essentially pressure-proportional, can thus be measured as a control variable for the feed control and thus as a stream volume control variable, and as a control variable for the compressed-gas supply to the spray head taking into consideration the previously-mentioned calibration curve. From a physical viewpoint this means that the voltage value measured at the feed system at a constantly adjusted mass rate of flow is a measurement for the stiffness or viscosity of the strand of mass exiting from the application nozzle.

In particular in the case of large technical applications, in which the paste is not supplied through a metering cylinder, but through an annular pipeline, which is tapped at individual stations, measuring the feed stream is necessary with the help of a flow-measuring device, for example a gear measuring cell or an inductive measuring cell in order to carry out control over a stream volume. Furthermore a pressure sensor arranged as much as possible near the application nozzle is additionally needed in this case, through which the compressed-gas supply (also in accordance with an empirical calibration curve) is controlled.

BRIEF DESCRIPTION OF THE DRAWINGS

The invention will be discussed in greater detail hereinafter in connection with the drawing. The single FIGURE shows a block diagram of a preferred exemplary embodiment of a paste-applying device.

DETAILED DESCRIPTION

The paste-applying device illustrated in the block diagram contains a storage container 1 for the paste and a feed pump 2, which feeds the paste from the storage container 1 to a metering device 3. The outlet of the metering device is connected to a spray head S. Sensors 7 (illustrated by dashes) are furthermore provided on the path to the spray head S. A further storage container 4 or a connection for a compressed gas (compressed air or inert gas) is connected to a valve V, with which the compressed-gas supply to the spray head S can be controlled. The block diagram shows furthermore a desired-value adjuster or regulator 5, which is connected to both the metering device 3 and also to a control device 6. The control device 6 is connected on the inlet side additionally to the outlet of the respective sensor 7, while it is connected on the outlet side to the control inlet of the valve V, which is for example constructed as a proportional valve.

The paste, which is for example a hardenable glue or sealer, is moved from the storage container 1 with the help of the feed pump 2 to the metering device 3. The amount of glue or sealer, which is to be applied per unit of time onto a workpiece, for example onto a piece of sheet metal B for use as an automobile body panel, is adjusted by the desired-value adjuster 5 and is forwarded in the form of an electrical signal to the metering device 3, which, based on this desired value, conveys the desired amount of glue or sealer to the spray head S. An example for the design of such a spray head S is described in EP-A-0 367 985.

The strand of glue or sealer exiting from the paste-applying nozzle of the spray head S is mixed with the compressed air arriving through the valve V and is sprayed onto the sheet metal B. The spray head S and the workpiece B are at the same time moved relative to one another in a direction of the strip to be applied. In order to obtain a constant strip width on the workpiece B, the same compressed-air stream must be continuously supplied at a constant viscosity of the glue or sealer. The desired value for the amount of air to be admixed with the glue is forwarded to the control device 6 from the desired-value adjuster 5, through which control device 6 in turn adjusts the cross section of the throughlet of the valve V.

If during the operation, variations in the temperature and the composition, and thus in the viscosity of the glue occur, then the feed pressure must follow accordingly at a pregiven flow of the mass. Because of the simultaneously occurring change in viscosity, the compressed-air supply needs also to be changed in order to arrive at the same strip width. This is done with the help of a calibration-curve generator contained in the control device 6, the variable parameters of which are empirically determined and adjusted. The magnitudes of the regulating or controlling variables, such as the weight rate of flow, pressure, or temperature, are detected with the help of the sensors 7 at the outlet side of the metering device 3 or at the inlet side of the spray head S and are preferably forwarded in the form of electrical signals to the control device 6 for the purpose of controlling the valve V. With this it can be achieved that the amount of compressed air, which is mixed with the stream of glue or sealer, is controlled such that the same spray width is obtained at all times. Thus the problems of an excessive or reduced application of glue or sealer are avoided and a safe gluing of the workpieces is guaranteed.

The sensors 7 are advantageously designed as a temperature sensor, pressure sensor or as an amount-measuring cell. It is also possible to thereby provide several sensors, for example, one at the outlet of the metering device 3 and one at the glue inlet into the spray head S.

Epoxy-resin glues, glues having a polyurethane base or acrylate glues are, for example, suitable for use as glue and sealer; however, also other types of glues are suitable. The paste does not necessarily have to be a glue or sealer. The described device or rather the method carried out with this device is principally suited also for other essentially paste-like materials, the viscosity of which can vary in wide limits and which, in spite of this characteristic, are supposed to be evenly applied onto a workpiece B.

The above described device or the method carried out with this device are particularly suited for use in industrial manufacturing, in particular in connection with an industrial robot.

In summary the following is to be stated: An essentially paste-like compound is fed from a storage container 1 by means of a feed pump 2 to a metering device 3, which determines the amount of paste to be applied onto a workpiece B. The paste is guided to a spray head S, where it is mixed with compressed air from a further storage container 4 or through a suitable connection and is sprayed onto the workpiece B. The amount of compressed air, which is fed to the paste for spraying, is thereby controlled by means of a control device 6 in such a manner that a strip of an essentially constant width is sprayed onto the workpiece B.

The embodiments of the invention in which an exclusive property or privilege is claimed are defined as follows:

1. A method for applying a paste material, to a workpiece which is moveable relative to a spray device, the method comprising the steps of:

feeding the paste material to the spray device by the action of a feed pressure;

separating and/or mixing the paste material with a compressed gas within the spray device;

spraying the paste material onto the workpiece with the workpiece and the spray device being moved relative to one another;

measuring a temperature of the paste material prior to its entry into the spray device; and controlling the amount of compressed gas supplied per unit of time to the paste material in functional dependency on the measured temperature, so that a strip of paste material of essentially constant width is sprayed on along the workpiece.

2. The method of claim 1, further comprising the step of setting the functional dependency using a stored digital or analog, empirically determined calibration curve.

3. The method of claim 1, further comprising the step of controlling the relative velocity of the spray device and the workpiece so that an amount of paste material sprayed onto the workpiece per unit area is maintained constant.

4. A method for applying a paste material to a workpiece which is moveable relative to a spray device, the method comprising the steps of:

feeding the paste material to the spray device by the action of a feed pressure;

separating and/or mixing the paste material with a compressed gas within the spray device;

spraying the paste material onto the workpiece with the workpiece and the spray device being moved relative to one another;

determining the feed pressure of the paste material as a measure of its viscosity prior to its entry into the spray device;

adjusting a volume or mass stream of the paste material to a set value by varying the feed pressure at a constant flow cross section of the spray device; and controlling the amount of compressed gas supplied per unit of time to the paste material in functional dependency on the measured feed pressure so that a strip of paste material of essentially constant width is sprayed on along the workpiece.

5. The method of claim 4, wherein the step of adjusting the volume or mass stream to the set value includes varying a driving pressure or the electrical driving power of an electrically driven metering device to vary the feed pressure.

6. The method of claim 5, wherein the feed pressure is dependent upon a driving pressure, a driving power or a driving voltage level of the metering device, the step of controlling the amount of compressed gas supplied per unit of time being in functional dependency on the driving pressure or driving power of the metering device or the driving voltage level derived therefrom.

7. The method of claim 4, further comprising the step of directly measuring the volume or mass stream of the paste material with a flow meter or indirectly measuring the volume or mass stream of the paste material by measuring a piston speed of a metering cylinder forming a metering device.

8. The method of claim 4, further comprising the step of setting the functional dependency using a stored digital or analog, empirically determined calibration curve.

9. The method of claim 4, further comprising the step of controlling the relative velocity of the spray device and the workpiece so that an amount of paste material sprayed onto the workpiece per unit area is maintained constant.

10. A device for applying a strip of a paste material, to a workpiece, comprising:

a spray head moveable relative to the workpiece;

means for supplying said paste material into said spray head;

means for supplying a compressed gas to the spray head, said compressed gas being mixed with the paste material before being applied to the workpiece;

temperature sensing means positioned upstream of the spray head for measuring the temperature of the paste materials;

temperature sensitive regulator means for controlling the supply of compressed gas to the spray head, dependent on a set width of the mass strip to be applied along the workpiece.

11. The device of claim 10, further comprising:

a storage container for the paste material;

feed pump means for feeding the paste material to a metering device;

a second storage container or a connection for compressed gas, valve means for controlling the compressed gas supply to the spray head;

control device means for controlling said valve for the compressed gas supply so that the amount of compressed gas mixed with the paste material per unit of time is metered such that the spray head sprays a strip of paste material of an essentially constant width along the workpiece.

12. The device of claim 10, wherein the regulator means of the compressed gas supply comprises an analog or digital calibration curve generator.

13. The device of claim 10, further comprising regulator means for controlling the relative speed of the spray head and the workpiece such that an essentially constant amount of paste material per unit area is sprayed onto the workpiece.

14. A device for applying a strip of paste material to a workpiece, comprising:

a spray head moveable relative to the workpiece;

means for supplying said paste material to said spray head;

means for supplying compressed gas to the spray head, said compressed gas being mixed with the paste material before being applied to the workpiece;

pressure sensing means positioned upstream of the spray head for measuring the feed pressure of the paste material as a measure of the viscosity of said paste material;

paste material regulator means positioned upstream of the spray head for adjusting the volume or mass stream of the paste material to a set value by varying the feed pressure at a constant flow cross section in the spray head; and feed pressure sensitive regulator means for controlling the supply of compressed gas to the spray head, determined by a set width of the mass strip of paste material to be applied along the workpiece.

15. The device of claim 14, further comprising:

metering pump means for the paste material which is controlled by the paste material regulator means, the feed pressure of the paste material being dependent upon a driving pressure, a driving power or a voltage level of the metering pump means; and a device in communication with said feed pressure sensitive regulator means for controlling the compressed gas supply to the spray head, said device reacting to the driving pressure or the driving power or voltage level of the metering pump means.

16. The device of claim 14, wherein the regulator means of the compressed gas supply comprises an analog or digital calibration curve generator.

17. The device of claim 14, further comprising regulator means for controlling the relative speed of the spray head and the workpiece such that an essentially constant amount of paste material per unit area is sprayed onto the workpiece.

18. The device of claim 14, further comprising flow meter means positioned upstream of the spray head in a feed pipe for determining the volume or mass stream of the paste material.

19. The device of claim 14, further comprising a device for measuring the piston speed of a metering cylinder forming the metering device as a measure of the volume stream.

* * * * *

UNITED STATES PATENT AND TRADEMARK OFFICE
CERTIFICATE OF CORRECTION

PATENT NO. : 5 510 149
DATED : April 23, 1996
INVENTOR(S) : Josef SCHUCKER

It is certified that error appears in the above-indentified patent and that said Letters Patent is hereby corrected as shown below:

On the title page, item [63] and in Column 1; change "May 19, 1992" to ---March 19, 1992---.

Column 5, line 24; change "material, to a" to ---material to a---.

Column 6, line 28; change "material, to a" to ---material to a---.

Column 6, line 50; change "gas," to ---gas;---.

Signed and Sealed this

Fifth Day of November, 1996

Attest:

BRUCE LEHMAN

Attesting Officer     Commissioner of Patents and Trademarks